(12) United States Patent
Levy (10) Patent No.: US 11,348,028 B2
(45) Date of Patent: May 31, 2022

(54) CHARACTERISATION OF DYNAMICAL PHYSICAL SYSTEMS

(71) Applicant: OXFORD UNIVERSITY INNOVATION LIMITED, Botley (GB)

(72) Inventor: Matthew Chase Levy, San Francisco, CA (US)

(73) Assignee: NOBLE ARTIFICIAL INTELLIGENCE, INC., Newark, DE (US)

(\*) Notice: Subject to any disclaimer, the term of this patent is extended or adjusted under 35 U.S.C. 154(b) by 1050 days.

(21) Appl. No.: 15/579,580

(22) PCT Filed: May 25, 2016

(86) PCT No.: PCT/GB2016/051509
§ 371 (c)(1),
(2) Date: Dec. 4, 2017

(87) PCT Pub. No.: WO2016/193672
PCT Pub. Date: Dec. 8, 2016

(65) Prior Publication Data
US 2018/0174073 A1 Jun. 21, 2018

(30) Foreign Application Priority Data
Jun. 3, 2015 (GB) ..................................... 1509636

(51) Int. Cl.
*G06N 20/00* (2019.01)
*G06K 9/62* (2022.01)

(52) U.S. Cl.
CPC ........... *G06N 20/00* (2019.01); *G06K 9/6217* (2013.01); *G06K 9/6268* (2013.01)

(58) Field of Classification Search
CPC ..... G06N 20/00; G06K 9/6217; G06K 9/6268
See application file for complete search history.

(56) References Cited

U.S. PATENT DOCUMENTS

2009/0016599 A1   1/2009   Eaton et al.

OTHER PUBLICATIONS

Uchaikin et al., "Fractional Boltzmann Equation for Resonance Radiation Transport in Plasma," in arXiv preprint arXiv: 1008.4439 (2010). (Year: 2010).*
Stepanova, "Master Equation for Atomic Collision Cascades with Fixed Path Length between Collisions," in 105 Nuclear Instruments and Methods in Physics Res. B 33-37 (1995). (Year: 1995).*

(Continued)

*Primary Examiner* — Kamran Afshar
*Assistant Examiner* — Ryan C Vaughn
(74) *Attorney, Agent, or Firm* — Bryan Cave Leighton Paisner LLP (57) ABSTRACT

A dynamical physical system of particles represented by input data representing the phase space state of the particles over time is characterised by deriving a feature vector in respect of each particle comprising plural metrics that each describe a change in the phase space state of the particle over time. A classification of particles into plural classes is performed by applying a machine learning technique that operates on the feature vectors of the particles, and outputting classification data representing the classification.

22 Claims, 5 Drawing Sheets

(56) References Cited

OTHER PUBLICATIONS

Sinkus et al., "Particle Identification with Neural Networks Using a Rotational Invariant Moment Representation," in 389. 1-2 Nuclear Instruments and Methods in Physics Res. Section A: Spectrometers, Detectors and Associated Equipment 160-62 (1996). (Year: 1996).*
Adelmann et al., "From Visualisation to Data Mining with Large Data Sets," in Proc. 2005 Particle Accelerator Conf. 4114-16 (2005). (Year: 2005).*
Sun et al., "Controlling Chaos by PSO-[B]ased Neural Network," in 2009 Int'l Conf. Intelligent Human-Machine Systems and Cybernetics 249-52 (2009). (Year: 2009).*
Tilinin et al., "Path-Length Distribution of Photoelectrons Emitted from Homogeneous Noncrystalline Solids: Consequences for Inelastic-Background Analysis," in 52.8 Physical Rev. B 5935-46 (1995). (Year: 1995).*
Grote H et al., "Review Article: Pattern Recognition in high-energy physics," Reports on Progress in Physics, Institute of Physics Publishing, Briston, GB, vol. 50, No. 4, Apr. 1, 1987.
Verboncoeur, J "Particle Simulation of Plasmas: Review and Advances," Plasma Physics and Controlled Fusion, vol. 47, No. 5A, May 1, 2005.
Andrade, et al. "Application of Compressed Sensing to the Simulation of Atomic Systems," Proceedings of the National Academy of Sciences, vol. 109, No. 35, Aug. 13, 2012.
Mankel, "Pattern Recognition and Event Reconstruction in Particle Physics Experiments," Cornell University Library, 201 Olin Library Cornell University, Feb. 9, 2004.
Morabito, et al. "Plasma Evolution Control with Neuro-Fuzzy Techniques," In Control Conference (ECC), 1999 European (pp. 4188-4192) 1999.
Zhang, et al. "Detecting Temporal Patterns Using Reconstructed Phase Space and Support Vector Machine in the Dynamic Data System," Information and Automation (ICIA), 2011.

\* cited by examiner

CHARACTERISATION OF DYNAMICAL PHYSICAL SYSTEMS

CROSS-REFERENCE TO RELATED APPLICATIONS

This application is a National Stage of International Application No. PCT/GB2016/051509 filed on May 25, 2016 (published as WO/2016193672), which claims benefit of and priority to GB1509636.5 filed on Jun. 3, 2015. The contents of each of these applications are herein incorporated by reference in their entireties.

TECHNICAL FIELD

The present invention relates to characterising dynamical physical systems of particles.

BACKGROUND

Dynamical physical systems of particles are typically systems of micro- and nano-scale and involve large numbers of particles carrying out complex dynamical processes such as interactions with each other and external forces and influences. Characterising such physical systems, and hence identifying the underlying dynamical processes, is essential to basic research in a wide range of technical fields and hence to practical applications that depend thereupon. Many important areas of science advance by better understanding how micro- ($10^{-6}$ meters) and nano- ($10^{-9}$ meters) scale physical systems respond when placed under various forces, strains or drivers.

However, such characterisation is difficult due to the inherent complexity of the relevant situations and the dynamical processes. In some basic systems, the dominant dynamical process is evident and therefore can be studied using direct analysis or experimentation, enabling rapid advances. However in a very large number of topical systems, several hundreds or more nontrivial dynamical processes can act concurrently. In such situations these traditional methods do not allow one to predict, nor optimize, the material response, and hence these fields generally advance at a slower pace. In general, study of dynamical processes in physics has progressed relatively slowly in many fields over past decades.

A relevant example of a dynamical physical system of particles is a dense inertially confined fusion plasma under the illumination of high power laser light, which has practical applications in several fields, for example nuclear fusion. Existing methods in the high power laser matter interaction field have generally examined individual dynamical processes in isolation, or a few processes together, using analytical or simulation techniques. This provides useful, but inherently limited, information.

SUMMARY

The present invention is concerned with methods that allow such characterisation of a dynamical physical system in a useful manner.

According to the present invention, there is provided a method of characterising a dynamical physical system of particles represented by input data representing the phase space state of the particles over time, the method comprising:

deriving from the input data a feature vector in respect of each particle comprising plural metrics that each describe a change in the phase space state of the particle over time; and performing classification of particles into plural classes by applying a machine learning technique that operates on the feature vectors of the particles, and outputting classification data representing the classification.

Thus, the present invention makes use of classification using a machine learning technique. Specifically, this is done on a particle basis, that is to classify the particles into plural classes. This effectively uses the particles as a proxy, or a conduit, for characterising the dynamical physical system.

The classes into which the particles are classified may correspond to different types of dynamical process acting in the dynamical physical system. In that case, the method provides characterisation of the dynamical processes acting in the dynamical physical system, which may provide more information than trying to investigate the dynamical processes per se.

Further power is given to the classification by the design of the feature vector on which the machine learning technique operates. In particular, feature vectors in respect of each particle are derived from input data representing the phase space state of the particles over time, and comprises plural metrics that each describe a change in the phase space state of the particle over time. Various different metrics may be used, as described in more detail below, but they may for example, be metrics that describe motion of the particle, metrics that describe the position and/or time of an event related to a change in energy of the particle and/or metrics that are a representation of a trajectory of the particle. The feature vectors comprising these metrics may be thought of as a unique "fingerprint" of dynamical processes acting in the physical system. This layer of complexity in the method allows a connection between the particle properties and dynamical processes to be established. The classification of the particles may be thought of as a global snapshot of relevant dynamical processes acting in the complex dynamical physical system.

While the method may be performed in respect of input data produced over a single interval in time, additional power may be provided by performing the method in respect of input data produced at different intervals in time. This provides information on the temporal evolution of the dynamical physical system, for example on relative flows of energy and momentum in the dynamical processes acting in the dynamical physical system.

Applying this method yields substantially superior characterisation of the dynamical physical system that allows identification of significant dynamical processes that govern the response of the system to non-equilibrium forcing functions and influences. This may in turn be used to study and optimize those dynamical processes.

For example, as an example output, there may be generated a graphical representation of the distribution of particles in the classes, for example a straightforward bar chart showing the types of dynamical processes present, and the frequency of each of those processes. The classification data can be explored using varying levels of granularity, for example drilling down to see additional detail, thereby enabling a more comprehensive understanding of the material response.

BRIEF DESCRIPTION OF DRAWINGS

To allow better understanding, embodiments of the present invention will now be described by way of non-limitative example with reference to the accompanying drawings, in which.

DETAILED DESCRIPTION OF EXEMPLARY EMBODIMENTS

Figure 1:
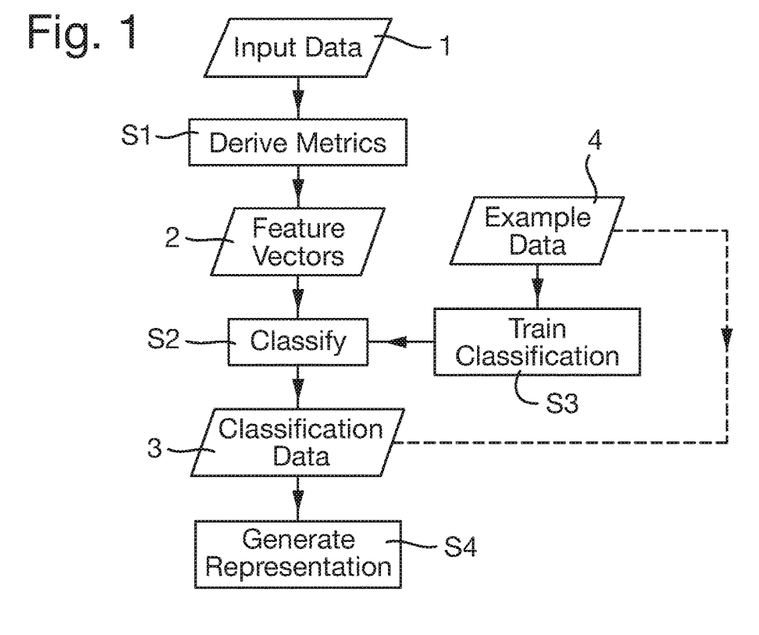
FIG. 1 is a flow chart of a method of characterising a dynamical physical system of particles using a supervised machine learning technique.
Figure 2:
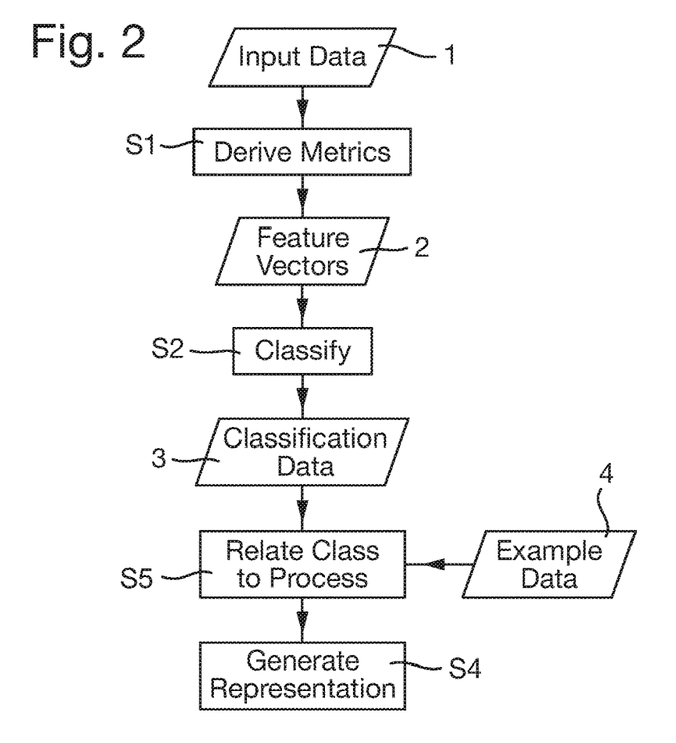
FIG. 2 is a flow chart of a method of characterising a dynamical physical system of particles using an unsupervised machine learning technique.

A method of characterising a dynamical physical system of particles using a supervised machine learning technique is shown in FIG. 1. By way of comparison, a method of characterising a dynamical physical system of particles using an unsupervised machine learning technique is shown in FIG. 2 and will be described below.

Either method may be implemented in a computer apparatus. To achieve this, a computer program capable of execution by the computer apparatus may be provided. The computer program is configured so that, on execution, it causes the computer apparatus to perform the method.

The computer apparatus, where used, may be any type of computer system but is typically of conventional construction. The computer program may be written in any suitable programming language. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

The method of FIG. 1 is performed as follows.

The method processes input data 1 that represents the phase space state of the particles of the dynamical physical system over time. As used herein, the term "data" is intended to be interpreted as an uncountable noun that encompasses singular and plural quantities.

The physical system is represented as a dynamical system, being a mathematical formalization which describes the time dependence of the position of a particle in space. The phase space state represents a state of the system in phase space at any given time. The phase space state is a point in the phase space of the dynamical system, being a space in which all possible states of a system are represented. The phase space of a system in this sense is a multi-dimensional space in which every degree of freedom or parameter of the system is represented as a dimension of the phase space. For clarity, it is noted that elsewhere the term "phase space" is sometimes used in a manner in which in context means the "phase space state" as used herein. For example, elsewhere the phrase "phase space of a system" may in context be used to refer to the state of the system in its phase space.

The input data 1 represents the phase space state over time, starting from a particular initial condition and evolving over time. That evolution may be considered as a phase space trajectory of the system through the high-dimensional space. The period of time may be any suitable period for the dynamical physical system under study.

The input data 1 may represent the dynamical physical system over a single interval in time. However, additional power may be provided by the input data 1 representing the dynamical physical system over successive intervals in time. In this case, the method is performed on the input data 1 in respect of each interval of time.

The input data 1 may be any partial or complete representation of the phase space distribution of particles. Thus, the input data 1 may represent various different parameters of the particles within the phase space.

The phase space state represented by the input data 1 may include positions of the particles in a configuration space. The position may be represented by generalized coordinates in a vector space defined by these coordinates called the configuration space which is part of the phase space of the physical system. Such generalised co-ordinates may represent positions in any manner. They may represent the positions as a three-dimensional vector, for example a vector $r=(x, y, z)$ where x, y and z are the positions in three dimensions, or may represent position in a space of lower dimensionality.

The phase space state represented by the input data 1 may include further properties of the particles, for example as follows.

The phase space state represented by the input data 1 may include one or more properties that are dependent on the motion of the particles. A possible property is a derivative of the positions of the particles in time, for example velocity or acceleration. Other such properties that may be used in any combination, and instead or in combination with a derivative, include momentum, Lorentz factor (optionally a signed Lorentz factor) and/or energy of the particles.

Non-limiting examples of the input data 1 are as follows:

The configuration space position and the derivatives of the positions with respect to time The configuration space position and canonical momentum The configuration space position and velocity The configuration space position and Lorentz factor (optionally the signed Lorentz factor) associated with motion in each dimension The configuration space position and signed kinetic energies associated with motion in each dimension The representation of the properties may be in any manner. For example, the properties may be represented directly by canonical quantities or by quantities that are scaled or normalized.

The physical system may be any type of physical system of particles under study, typically being a micro-scale or nano-scale physical system. The physical system may be one studied in basic research or in applications that depend thereupon.

The term "particle" is used in its normal sense to mean a minute, localised element of matter. Typically, the particle will have an average diameter of 100 µm or less, more typically 10 µm or less. Thus, the particles may have an average diameter on a micro-scale (of the order of 0.1 µm to 100 µm), but in many physical systems, the particles are significantly smaller and may have an average diameter on a nano-scale (of the order of 0.1 nm to 100 nm) or in principle even smaller.

The particles may be any type of particles, depending on the nature of the physical system. Examples of particles include, without limitation, groups of molecules, individual molecules, atoms, ions or sub-atomic particles (for example electrons), or any combination thereof. For example, in the case that the physical system is a plasma, the particles may comprise electrons and ions. Alternatively, the particles may be fluid elements of a fluid. In the case that the fluid is a liquid, the particles are not separate but are elements of a continuous liquid (although they may correspond to a collection of molecules of the liquid).

Some non-limitative examples of physical systems which may be studied are:

High energy density plasmas

Laser-driven plasmas

Fusion plasmas, for example Inertial Confinement Fusion plasmas or Magnetic Confinement Fusion plasmas, for example of the type disclosed in Bishop, C. M. (1994). Review of Scientific Instruments, 65(6), 1803-1831, doi:10.1063/1.1144830

Low temperature plasmas

Micro-physics of astrophysically-relevant plasma processes, e.g., collisionless shock waves and their acceleration of particles Plasma states comprising electrons and singly-charged or multiply-charged ions Plasma states comprising electrons and positrons Dusty plasmas Atomistic dynamics Molecular interactions Warm dense matter interactions Plasma applications, for example of the type disclosed in Chen, (1995), Industrial applications of low temperature plasma physics. Phys. Plasmas, 2 (June), 2164-2175, doi:10.1063/1.871477

Figure 3:
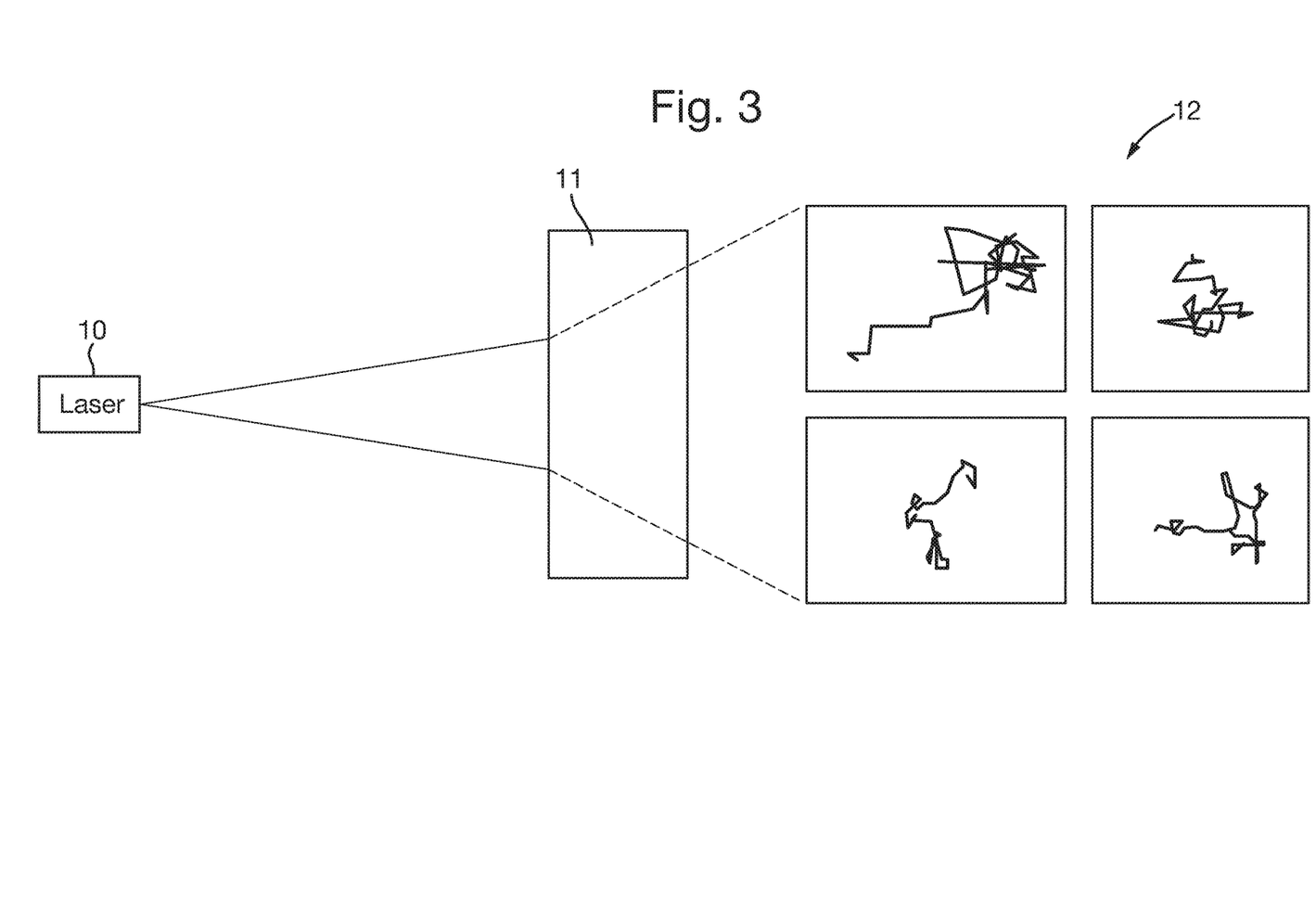
FIG. 3 is a schematic diagram of a dynamical physical system that is a plasma of a metal driven by a laser, as well as example trajectories of particles represented by the input data.

FIG. 3 shows an illustrative example where the physical system is a plasma of a metal driven by a high-power laser, for example petawatt-scale ($10^{-15}$ Watt) laser. In particular, FIG. 3 shows the laser 10 that illuminates a metal target 11. Particles of the metal that interact with the laser carry out the material response to the laser driving force. In this situation, the laser is the non-equilibrium driving force and the metal, which is rapidly field-ionized into a micro-scale hot dense plasma comprising electrons and ions, is the dynamical physical system. The relevant dynamical processes in this physical system, governing how the metal responds to the laser, are therefore associated with the laser acceleration of the electron and ion particles.

FIG. 3 also shows representations 12 of four different sample electron trajectories in space, being a subset of the many hundreds present, involved in the material response. Each trajectory is represented by the time-series of positions of the particle, where time is labelled appropriately. Although not visible in FIG. 3 due to being a black-and-white drawing, the time (corresponding to different points along the trajectory) can be denoted by different shadings or colours in a displayed representation. In this example, the input data 1 represents the phase space of all the particles that respond to the laser.

Further information about this illustrative example is given below by way of example, although the scope of the invention is not restricted to this case.

The input data 1 may be derived in different ways, for example as follows.

The input data 1 may be derived from physical measurements of an actual dynamical physical system. For example, the phase space state over time may be recovered from a suitable high quality high repetition rate experimental apparatus, or from the output of relevant industrial processes. Such experimental input to the method can be acquired using a variety of sensors and techniques. By way of non-limitative example, this may include any of the following:

Particle energy spectra

Spectra of radiation emitted by particles

Absorption of the energy of the driver, that is of the non-equilibrium force applied to the system Streaked optical imaging X-ray imaging Fusion product, e.g., neutron, yields Charged-particle probing Alternatively, the input data 1 may be derived from the output of a numerical simulation. It may include a subset of the data output by the numerical simulation.

Numerical simulations form a modern approach to carrying out scientific inquiry using supercomputers. These simulations utilize and solve equations representing relevant laws of nature, for example Maxwell's equations and the Lorentz force equation. Typically such numerical simulations have been extensively tested for accuracy, debugged, benchmarked, and confirmed to agree with experimental reality. Their output has been widely accepted in the scientific community to correspond to reality and have been established as a fundamental pillar of modern physics. Such computational physics is thus not abstract, and is widely afforded comparable importance to experimental physics and to theoretical physics.

By way of illustration, one possible type of numerical simulation that may be used is a particle-in-cell (PIC) numerical simulation. A PIC numerical simulation refers to a technique used to solve a certain class of partial differential equations. In this method, individual particles in a Lagrangian frame are tracked in continuous phase space, whereas moments of the distribution such as densities and currents are computed simultaneously on Eulerian (stationary) mesh points. Software representing a PIC numerical simulation may be referred to as a PIC code. At their core, PIC codes are designed to predict the time history of a system comprised of many charged particles. PIC codes solve this problem very generally, making few assumptions about the properties of the charged particles in the system. This generality implies the value of PIC codes as well as their computational expense. PIC codes may implement the Maxwell-Vlasov system of equations describing this general approach. Maxwell's equations cover the fields, currents, and so on that are associated with the moving charged particles comprising the system. The Vlasov equation describes the evolution of these particles in six dimensional phase space, i.e., three spatial coordinates and three momentum coordinates, and in time. These codes are extensively used to inform upcoming experiments, guide theoretical developments, and generally to advance the scientific enterprise.

In situations where the available data is limited by some external factor and so is a sparse representation of the dynamical physical system, then the input data 1 may be derived using a compressive sensing technique. Compressive sensing is a statistical signal processing technique that enables a distribution to be efficiently recovered from sparse data by finding solutions to underdetermined linear systems. Compressive sensing provides efficient acquisition and reconstruction of a signal. By way of example, such compressive sensing may be performed as disclosed in Candes, Romberg & Tao, (2006), IEEE Transactions on Information Theory, 52(2), 489-509, doi:10.1109/TIT.2005.862083 or as disclosed in Candes & Tao, (2006), IEEE Transactions on Information Theory, 52(12), 5406-5425, doi:10.1109/TIT.2006.885507.

Compressive sensing may be applied however the input data 1 is derived. It may commonly be applied where the input data 1 is derived from physical measurements, in which case it is typically impractical to obtain a full series of measurements of every particle in the dynamical physical system of interest. However, compressive sensing may also be applied where the input data 1 is derived from the output of a numerical simulation. Some numerical simulations may provide a complete representation, but others may be sparse so that compressive sensing is applicable.

Reverting to the method of FIG. 1, in step S1 the input data 1 is processed by deriving a feature vector 2 in respect of each particle from the input data 1. The feature vectors 2 each comprise plural metrics that each describe a change in the phase space state of the particle over time. The feature vectors 2 therefore establish a "fingerprint" of each dynamical process acting in the physical system as a basis for subsequent classification using a machine learning technique.

A wide range of metrics may be selected. Generally metrics are chosen that represent changes in the phase space state of the particles that are relevant to the dynamical physical system and its underlying dynamical processes.

Some examples of suitable metrics will now be described. These and other metrics may be used together in any combination.

The metrics may include one or more metrics that describe motion of the particle. Examples of such metrics that describe motion of the particle may include any of the following:

a vector or magnitude of displacement from an initial position over time;

a vector or magnitude of velocity over time;

a vector or magnitude of rate of displacement from an initial position over time; or a vector or magnitude of Lorentz factor over time or position.

Another example of such a metric that describes motion of the particle is a metric that represents a distribution of path-lengths of straight-line displacements of the particle, for example being a frequency distribution. Other statistical representations of trajectories may alternatively be used.

Another example of such a metric that describes motion of the particle is a metric that represents the Lorentz factor of the particle over time.

Another example of such a metric that describes motion of the particle is a metric that comprises a three dimensional array, with array position corresponding to the configuration space of the particle and array value corresponding to the particle Lorentz factor.

The metrics may include one or more metrics that describe the position and/or time of an event related to a change in energy of the particle. Such an event related to a change in energy of the particle may be related to a discontinuous change in energy of the particle.

Such a metric that describes the position and/or time of an event related to a change in energy of the particle may be a vector or magnitude of displacement from initial position prior to a change in energy. The change in energy in this example may be a change in energy of a degree that is characteristic of a physical event of interest. For example, in the case of a physical system that is a plasma under the illumination of laser light the physical event of interest may be an acceleration to the ponderomotive potential energy of the laser light.

The metrics may include one or more metrics that is a representation of a trajectory of the particle. This type of metric has the advantage of allowing the metric to be subsequently processed using known image processing techniques. Metrics that represent a trajectory may have any of the following features in any combination.

Such a trajectory may be represented by a series of positions of the particle.

The series of positions of the particle correspond to different times.

Each position of the particle may be labelled with the corresponding time. The times may be represented by shades or colours in a representation of the trajectory that may be displayed.

Alternatively or additionally, each position of the particle may be labelled with one or more properties of particle, for example momentum, Lorentz factor (optionally a signed Lorentz factor) and/or energy. The quantities of such a property may be represented by shades or colours.

Such a trajectory may be in any suitable space, for example in configuration space or in phase space.

Such a trajectory may represented be in three dimensions, or projected to lower dimensionality.

The computations used to derive the metrics from the input data can be performed in the programming language of the computer program used to implement the method. The resultant feature vectors 2 can be stored in a memory of the computer apparatus, for example a relational or other class of database, depending on the number of particles in the physical system and on performance and memory requirements.

For a metric of any type, the metric may comprise one or more scaled quantities, for example normalised quantities. In the case of a metric that is a representation of a trajectory of the particle, then the scaling may be any linear or nonlinear operation, for example a translation of the trajectory so that it originates, or has a mean position, in the centre of an image of the trajectory, or for example a scaling the trajectory in space by a multiplier.

Figure 4:
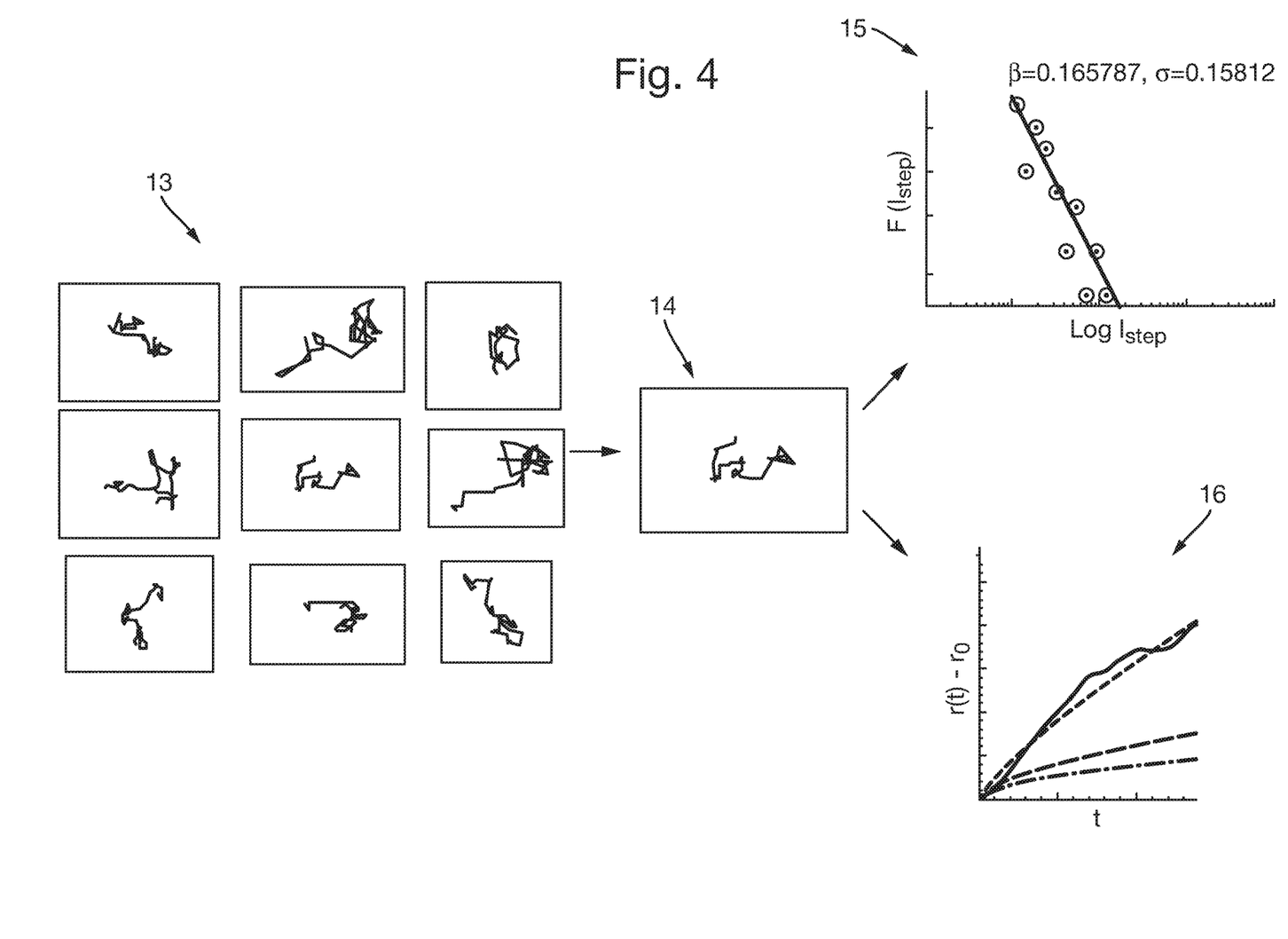
FIG. 4 is a diagram showing example trajectories of particles represented by the input data and examples of two metrics derived for one of the particles.

FIG. 4 illustrates some example trajectories metrics derived therefrom for the illustrative example of FIG. 3 where the physical system is a plasma of a metal driven by a high-power laser. In particular FIG. 4 shows representations 13 of nine example space trajectories of particles in the system. As in FIG. 3, each trajectory is represented by the time-series of positions of the particle, where time is labelled appropriately. Although not visible in FIG. 4 due to being a black-and-white drawing, the time (corresponding to different points along the trajectory) can be denoted by different shadings or colours in a displayed representation.

FIG. 4 also shows a representation 14 of an example of the trajectory of one particle, enlarged to show detail, as well as two graphs 15, 16 which illustrate the example metrics of the trajectory shown in that representation 14. The graph 15 shows a metric that is the frequency distribution (F(lstep)) of path-lengths (lstep) of the straight-line displacements of the particle, the path-lengths (lstep) being plotted on a logarithmic scale. The graph 16 shows the time-rate of the particle's displacement from its initial position in configuration space (r(t)—r0). Such metrics are derived for all the particles.

Reverting to the method of FIG. 1, in step S2 a classification of the particles is performed. The classification classifies the particles into plural classes. The classes into which the particles are classified may correspond to different types of dynamical process acting in the dynamical physical system. Classification data 3 representing the classification is output.

In the method of FIG. 1, the classification performed in step S2 applies a supervised machine learning technique that operates on the feature vectors 2 of the particles.

The classification of step S2 may be trained in step S3 using example data 4 that comprises feature vectors of training examples of particles in respective classes. Step S3 is performed as a preliminary step prior to performing the classification in step S2. Thus, step S3 may be performed contemporaneously with the rest of the method, for example in the same computer apparatus in which case step S3 may be implemented in a module of the same computer program as the remainder of the method. Alternatively, step S3 may be performed in advance. In that case, step S3 may be implemented in a separate computer program from steps S1 and S2.

The supervised machine learning technique may be of any known type. Such supervised machine learning is the machine learning task of inferring a function from example data that is a set of examples in known classes (sometimes referred to as being "labelled"). In supervised machine learning, each example is a pair consisting of a feature vector and a desired class (sometimes referred to as "the supervisory signal"). A supervised learning technique analyses the example data and produces an inferred function, which can be used for mapping new examples. The inferred function is used in the classification of step S2. An optimal scenario will allow for the algorithm to correctly determine the class labels for unseen instances. This requires the learning algorithm to generalize from the training data to unseen situations.

Many supervised machine learning techniques are known and may be applied here. Non-limitative examples of such methods are Support Vector Machines, linear regression, logistic regression, neural networks, random decision forests (e.g., RANDOM FOREST™) and nearest neighbour methods.

The supervised machine learning technique may employ a scoring function, such as a distance function, as a measure of similarity between feature vectors.

The supervised machine learning technique may be probabilistic. Non-limitative examples of such are techniques are naive Bayes and linear discriminant analysis which use joint probability models, and logistic regression which uses a conditional probability model.

The supervised machine learning technique may use empirical risk minimization or structural risk minimization. Empirical risk minimization seeks the function that best fits the example data 4. Structural risk minimization includes a penalty function that controls the bias/variance trade-off.

The example data 4 comprises feature vectors of training examples of particles in respective classes. To provide classes that correspond to different types of dynamical process acting in the dynamical physical system under study, the training examples may be examples of particles that are characteristic of the dynamical process of interest. As a result, the classes into which the particles are classified in step S2 intrinsically correspond to the dynamical processes of which the training examples are characteristic, this relationship being shown schematically in FIG. 1 by the dotted line between the example data 4 and the classification data 3. In that manner, the classification of the particles effectively provides a global snapshot of those dynamical processes acting in the dynamical physical system. The relative proportion of particles in each class provides a comprehensive description of the dynamical physical system.

Figure 5:
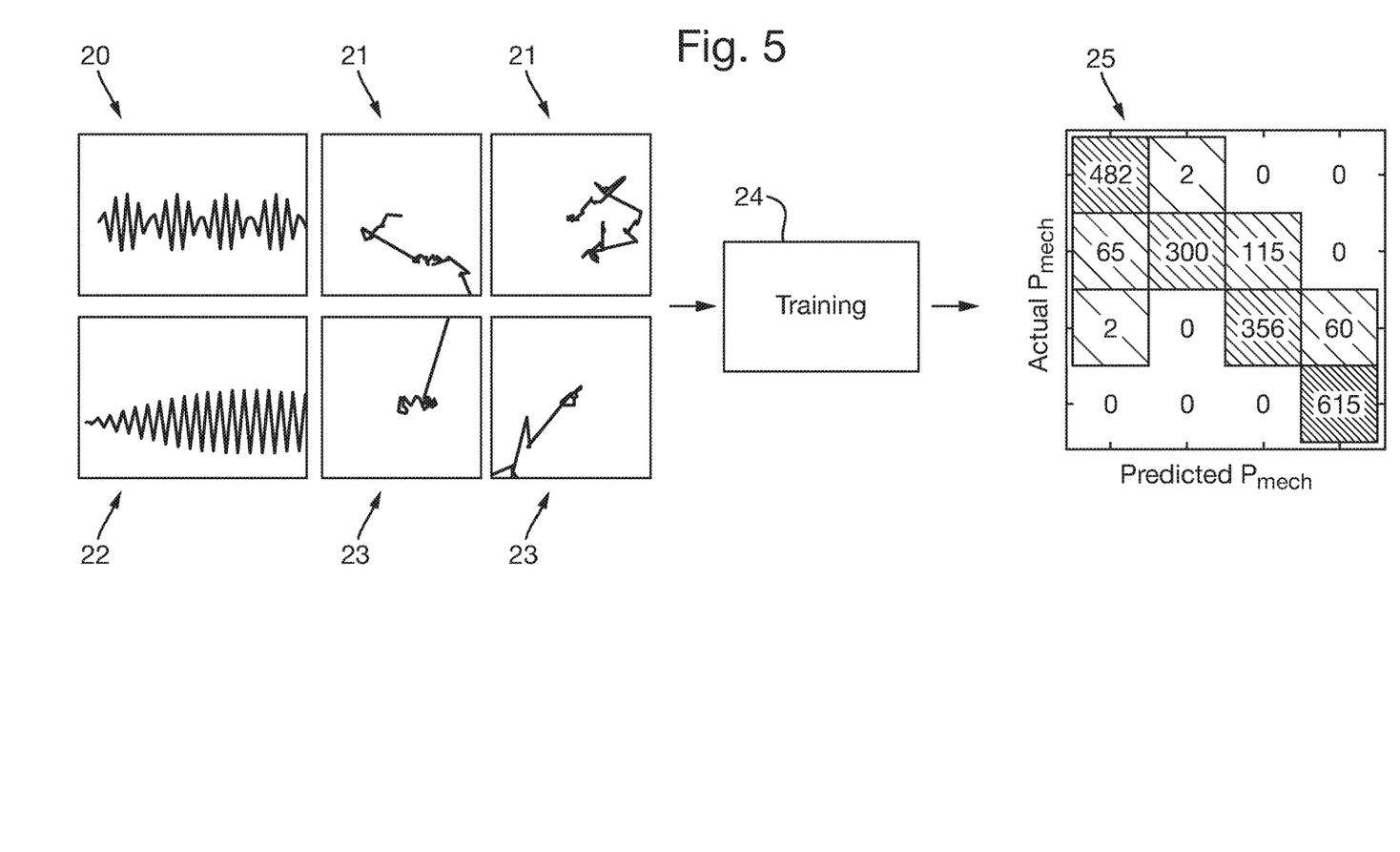
FIG. 5 is a diagram showing example trajectories of particles that are training examples for a supervised machine learning training and a resultant confusion matrix used in the training.

The example data 4 may typically represent a large number of particles. The example data 4 may be constructed from randomized instances of prototypical classes of particles undergoing topical dynamical processes. Non-limitative examples of classes of particles represented by the example data 4 include:
  Wave packets
  Gaussian wave envelopes
  Sinusoidal (i.e. plane wave) motion
  Linear motion
  Chaotic motion
  Multi-particle coupled motion
  Resonant motion
  Stochastic differential generating processes, for example Brownian processes, sub-diffusive processes and/or super-diffusive processes FIG. 5 illustrates some examples of the example data 4 applicable to the illustrative example of FIG. 3 where the physical system is a plasma of a metal driven by a high-power laser. In particular, FIG. 5 shows a representation 20 of a wave packet and illustrative representations 21 of example data 4 for examples that are wave packets. FIG. 5 also shows a representation 20 of a Gaussian waves envelope and illustrative representations 21 of example data 4 for examples that are Gaussian waves envelopes.

FIG. 5 illustrates the training method 24 using a supervised machine learning technique that generates and optimises a confusion matrix 25 using an iterative technique. The confusion matrix shown in FIG. 5 contains example results. The confusion matrix 25 has rows with indices actual Pmech corresponding to the classes of the example data 4 and columns with indices predicted Pmech corresponding to the classes that are predicted. In this type of example, the training optimises the confusion matrix 25 to increase the number of correctly predicted classes, i.e. to increase the numbers along the diagonal of the confusion matrix.

The classification data 3 may be used in various manners.

Optionally, the classification data 3 may be used by performing step S4. In step S4 a graphical representation of the distribution of particles in the classes is generated and displayed. Such a graphical representation may be, for example, a straightforward bar chart showing the classes and number of particles in each class, i.e. the relative frequency of each class. The graphical representation can be presented and interrogated using conventional tools, for example, by displaying with varying levels of granularity, to allow drilling down to see additional detail, thereby enabling a more comprehensive understanding of the material response.

Figure 6:
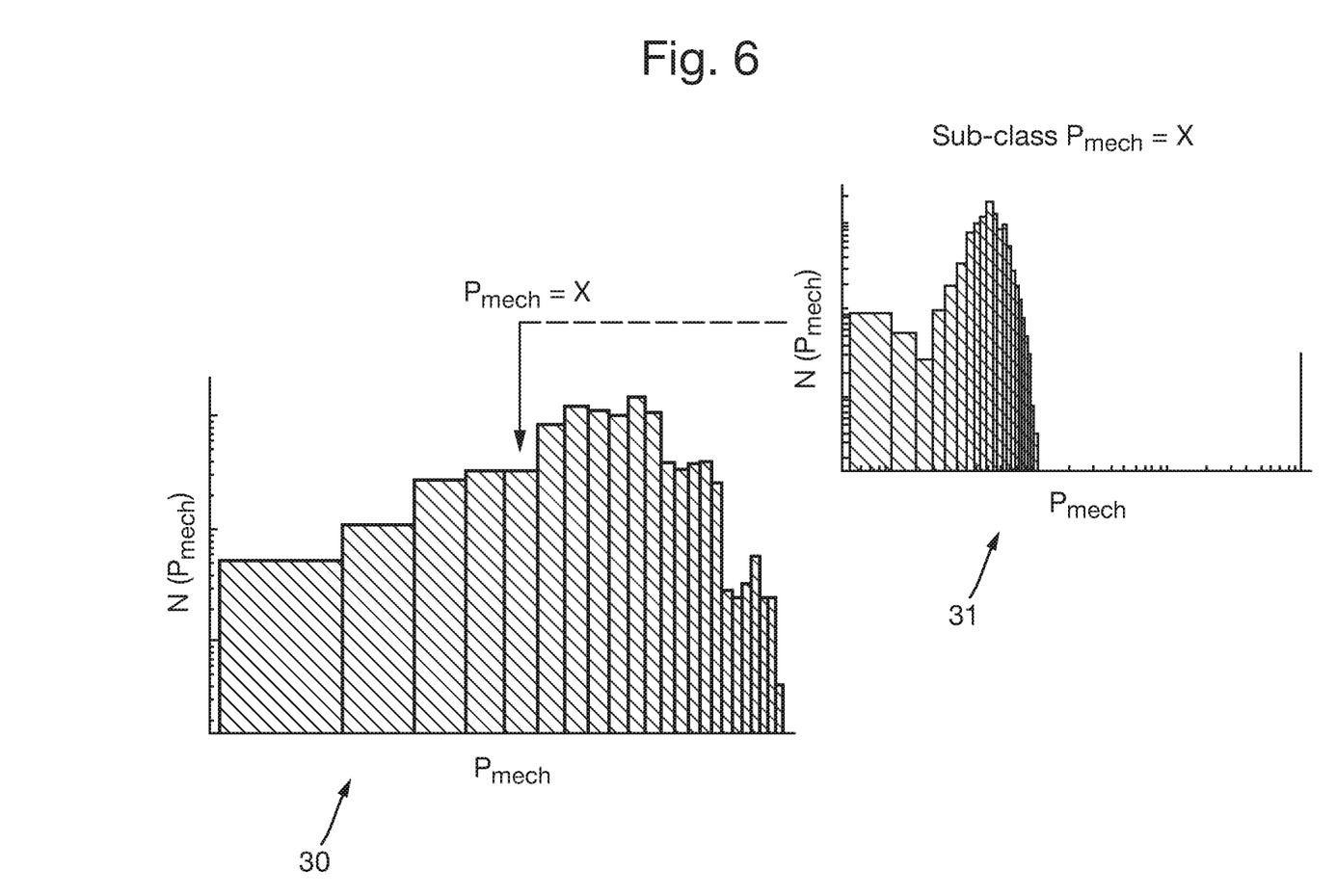
FIG. 6 is a diagram showing an example of bar charts of the distribution of particles in the classes represented by derived classification data at two levels of granularity.

FIG. 6 illustrates an example of a graphical representation in the form of a bar chart that may be generated in step S4 for the illustrative example of FIG. 3 where the physical system is a plasma of a metal driven by a high-power laser. In FIG. 6, the horizontal axis shows the classes corresponding to dynamical processes present labelled by indices Pmech and the vertical axis corresponds to the number of particles N(Pmech) in each class Pmech, i.e. the frequency of each of those processes. To illustrate representation of the classification data 3 with varying levels of granularity, FIG. 6 includes a main plot 30 showing the overall distribution using a broad classification, and an inset plot 31 showing the distribution of a single bar in the main plot 30, so as to show details of classes of dynamical process that are sub-classes of a class of the broad classification in the main plot 30. In this manner, the graphical representation enables a comprehensive understanding of the material response.

Where the input data 1 represents the dynamical physical system over successive intervals in time, as the method is performed on the input data 1 in respect of each interval of time, the classification data 3 that is output represents the classification of the particles into the plural classes in respect of each interval of time. As a result, the classification data 3 characterises the evolution of the dynamical physical system over the successive intervals of time, for example on relative flows of energy and momentum in the dynamical processes. This information on the temporal evolution of the dynamical physical system provides additional power to the characterisation of the dynamical physical system.

The method of FIG. 2 will now be described. By way of comparison, the method of FIG. 2 is in general terms the same as the method of FIG. 1 except that the classification performed in step S2 uses an unsupervised machine learning technique, instead of a supervised machine learning technique. Accordingly, corresponding steps and elements use the same reference numerals and the description of the method of FIG. 1 above applies equally to the method of FIG. 2, except for the changes described below.

In the method of FIG. 2, the input data 1 and step Si are the same as in the method of FIG. 1 with the result that the feature vectors 2 are also the same.

In step S2, a classification of the particles is performed. The classification classifies the particles into plural classes. Classification data 3 representing the classification is output. However, the classification performed in step S2 applies an unsupervised machine learning technique that operates on the feature vectors 2 of the particles. The machine learning technique compares the feature vectors 2 of the particles as between different particles. The feature vectors 2 are classified on the basis of the comparison. Thus, the classes are identified from the features vectors 2 themselves. Thus, the method of FIG. 2 does not perform the training of step S3.

The unsupervised machine learning technique may be of any known type. In an unsupervised machine learning approach, a scoring function, for example an established distance function, such as a Levenshtein function, is used to compare the feature vectors and identify the classes. In general, in unsupervised machine learning, the problem is to find hidden structure in unclassified (unlabelled) data. Unsupervised learning is closely related to the problem of density estimation in statistics and may use related techniques. However, applicable unsupervised machine learning also includes many other techniques that seek to identify classes within the data.

Many unsupervised machine learning techniques are known and may be applied here. Non-limitative examples of such methods are techniques that use clustering (for example k-means, mixture models, hierarchical clustering), and techniques for learning latent variable models, such as an Expectation-Maximization algorithm (EM), the method of moments or blind signal separation techniques (for example principal component analysis, independent component analysis, non-negative matrix factorization or singular value decomposition).

Due to the choice of metrics used in the feature vectors 2, such unsupervised machine learning techniques identify germane classes, as well as performing the classification of individual particles. The relative proportion of particles in each class thus provide a comprehensive description of the dynamical physical system. The classes may correspond to dynamical processes acting in the dynamical physical system, thereby allowing identification of dynamical processes that are significant in the dynamical physical system.

As the machine learning technique is unsupervised, the physical significance of the classes and any relationship with dynamical processes is not intrinsically known. This contrasts with the supervised machine learning technique used in FIG. 1. However, it may in fact provide an advantage in allowing the recognition of types of dynamical processes that were not previously considered and that otherwise might not have been identified. Thus, the classes of particles represented by the classification data 3 may be studied to identify dynamical processes to which they relate. This study may be performed by the user, or the method may include steps that assist the user.

By way of example of a step to assist the user, the method of FIG. 2 may optionally include step S5 which is performed as follows. In step S5, the group of particles in each class is related to a respective dynamical process by comparing the feature vectors of the particles with example data 4. This example data 4 takes the same form as in the method of FIG. 1. That is the example data 4 comprises feature vectors of training examples of particles in respective classes that are characteristic of respective dynamical processes of interest. The comparison may use known techniques, for example using a scoring function, such as an established distance function, such as a Levenshtein function. Thus, the comparison with the example data 4 allows the classes to be related to the dynamical processes of interest of which the example data 4 is characteristic.

Thus, the classification data 3 that is output characterises the dynamical physical system.

In the method of FIG. 2, step S4 may optionally be performed as in the method of FIG. 1. Steps S4 and S5 may be performed in either order or in parallel.

The invention claimed is:

1. A method of characterising a dynamical physical system of particles represented by input data representing a phase space state of the particles over time, the method comprising:
    deriving from the input data a feature vector in respect of each particle, the feature vector comprising plural metrics that describe a change in the phase space state of the particle over time and the plural metrics include: at least one metric that describes a motion of the particle, at least one metric that describes the position and time of an event related to a change in energy of the particle, or at least one metric that is a representation of a trajectory of the particle;
    performing using a machine learning technique that operates on the feature vectors of the particles, classification of the particles into plural classes, wherein:
        the plural classes relate to types of dynamical physical processes that correspond to global characteristics of the dynamical physical system; and
        at least a portion of the dynamical physical processes characterize interactions of the particles with each other or interactions of the particles with forces operating within the dynamical physical system; and
    outputting classification data representing the classification, the classification data indicating the types of dynamical physical processes detected in the dynamical physical system and a distribution of the particles in the plural classes relating to the dynamical physical processes; and
    wherein the machine learning technique is a supervised machine learning technique trained using feature vectors of training examples of particles in respective classes or an unsupervised machine learning technique that is trained via comparison amongst the feature vectors of the particles themselves.

2. The method of claim 1, wherein the phase space state represented by the input data includes positions of the particles.

3. The method of claim 1, wherein the phase space state represented by the input data further includes properties of the particles that are dependent on motion of the particles.

4. The method of claim 1, wherein the plural metrics used to derive the feature vector in respect of each particle comprise metrics that describe:
   a displacement of the particle;
   a velocity of the particle;
   a Lorentz factor of the particle;
   a distribution of path-lengths of straight-line displacements of the particle; and
   an event related to a change in energy of the particle.

5. The method of claim 1, wherein the metrics include a metric that represents a distribution of path-lengths of straight-line displacements of the particle.

6. The method of claim 1, wherein the metrics include a metric that represents a Lorentz factor of the particle over time.

7. The method of claim 1, wherein the metrics include one or more metrics that describe a position and/or time of an event related to a change in energy of the particle.

8. The method of claim 7, wherein the event is related to a discontinuous change in energy of the particle.

9. The method of claim 7, wherein the metrics include a metric that is a vector or magnitude of displacement from an initial position prior to the change in energy.

10. The method of claim 1, wherein the metrics include a representation of a trajectory of the particle.

11. The method of claim 1, wherein the metrics comprise scaled quantities.

12. The method of claim 1, wherein the classes correspond to different types of dynamical process acting in the dynamical physical system.

13. The method of claim 12, wherein the plural classes and global characteristics of the dynamical physical system correspond to at least three of the following dynamical physical processes acting in the dynamical physical system: wave packets; Gaussian wave envelopes; sinusoidal motion; linear motion; chaotic motion; multi-particle coupled motion; resonant motion; and stochastic differential generating processes.

14. The method of claim 1, wherein the machine learning technique is a supervised machine learning technique trained using feature vectors of training examples of particles in respective classes.

15. The method of claim 14, further comprising training the classification using the feature vectors of training examples of particles in the respective classes.

16. The method of claim 1, further comprising deriving the input data from physical measurements of a dynamical physical system which are obtained from an output of a particle-in-cell numerical simulation, the input data being derived using a compressive sensing technique, the input data representing the dynamical physical system over successive intervals in time, wherein the method is performed on the input data in respect of each interval of time.

17. The method of claim 1, further comprising generating a graphical representation of a distribution of particles in the classes.

18. The method of claim 1, wherein the particles comprise groups of molecules, individual molecules, atoms, ions, sub-atomic particles, or any combination thereof, and wherein the particles have an average diameter of 100 μm or less.

19. The method of claim 1, further comprising generating a graphical representation of a trajectory of a particle, wherein a position of a particle in the trajectory is shaded or coloured based on a corresponding time and the position of the particle is labeled with a property of the particle.

20. A system for characterising a dynamical physical system of particles represented by input data representing a phase space state of the particles over time comprising:
   a computer apparatus that includes a non-transitory computer-readable storage medium storing a computer program, the computer program being configured to cause the computer apparatus to:
      derive from the input data a feature vector in respect of each particle, the feature vector comprising plural metrics that describe a change in the phase space state of the particle over time and the plural metrics include: at least one metric that describes a motion of the particle, at least one metric that describes the position and time of an event related to a change in energy of the particle, or at least one metric that is a representation of a trajectory of the particle;
      perform using a machine learning technique that operates on the feature vectors of the particles, classification of the particles into plural classes, wherein:
         the plural classes relate to types of dynamical physical processes that correspond to global characteristics of the dynamical physical system; and
         at least a portion of the dynamical physical processes characterize interactions of the particles with each other or interactions of the particles with forces operating within the dynamical physical system; and
      output classification data representing the classification, the classification data indicating the types of dynamical physical processes detected in the dynamical physical system and a distribution of the particles in the plural classes relating to the dynamical physical processes; and
   wherein the machine learning technique is a supervised machine learning technique trained using feature vectors of training examples of particles in respective classes or an unsupervised machine learning technique that is trained via comparison amongst feature vectors of the particles themselves.

21. A method of characterising a dynamical physical system of particles represented by input data representing a phase space state of the particles over time, the method comprising:
   deriving from the input data a feature vector in respect of each particle, the feature vector comprising plural metrics that describe a change in the phase space state of the particle over time and the plural metrics include: at least one metric that describes a motion of the particle, at least one metric that describes the position and time of an event related to a change in energy of the particle, or at least one metric that is a representation of a trajectory of the particle;
   performing using machine learning technique that operates on the feature vectors of the particles, classification of the particles into plural classes, wherein:
      the plural classes relate to types of dynamical physical processes that correspond to global characteristics of the dynamical physical system; and at least a portion of the dynamical physical processes characterize interactions of the particles with each other or interactions of the particles with forces operating within the dynamical physical system; and outputting classification data representing the classification, the classification data indicating the types of dynamical physical processes detected in the dynamical physical system and a distribution of the particles in the plural classes relating to the dynamical physical processes, the input data being derived using a compressive sensing technique from physical measurements of a dynamical physical system which are obtained from an output of a particle-in-cell numerical simulation.

22. A system for characterising a dynamical physical system of particles represented by input data representing a phase space state of the particles over time comprising:

a computer apparatus that includes a non-transitory computer-readable storage medium storing a computer program, the computer program being configured to cause derive from the input data a feature vector in respect of each particle, the feature vector comprising plural metrics that describe a change in the phase space state of the particle over time and the plural metrics include: at least one metric that describes a motion of the particle, at least one metric that describes the position and time of an event related to a change in energy of the particle, or at least one metric that is a representation of a trajectory of the particle;

performing using a machine learning technique that operates on the feature vectors of the particles, classification of the particles into plural classes, wherein:

the plural classes relate to types of dynamical physical processes that correspond to global characteristics of the dynamical physical system; and at least a portion of the dynamical physical processes characterize interactions of the particles with each other or interactions of the particles with forces operating within the dynamical physical system; and output classification data representing the classification, the classification data indicating the types of dynamical physical processes detected in the dynamical physical system and a distribution of the particles in the plural classes relating to the dynamical physical processes, the input data being derived using a compressive sensing technique from physical measurements of a dynamical physical system which are obtained from an output of a particle-in-cell numerical simulation.

* * * * *